US006341172B1

(12) United States Patent
Xu et al.

(10) Patent No.: US 6,341,172 B1
(45) Date of Patent: *Jan. 22, 2002

(54) ACQUISITION SCHEME FOR AN ELECTRON PORTAL IMAGING SYSTEM

(75) Inventors: Ming Xu, San Ramon; Zheng Chen, Pleasant Hill, both of CA (US)

(73) Assignee: Siemens Medical Systems, Inc., Iselin, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,600

(22) Filed: Feb. 28, 1997

(51) Int. Cl.[7] ................................................. G06K 9/00
(52) U.S. Cl. .......................... 382/132; 378/95; 382/168
(58) Field of Search .......................... 600/407; 382/168, 382/171, 273, 128–134; 424/9.4; 250/582; 378/207, 98.8, 97, 95; 128/922, 920; 606/33, 97

(56) References Cited

U.S. PATENT DOCUMENTS

| | | | | | |
|---|---|---|---|---|---|
| 4,917,097 A | * | 4/1990 | Proudian et al. | ............ | 600/463 |
| 4,922,915 A | * | 5/1990 | Arnold et al. | ............... | 382/128 |
| 4,934,782 A | * | 6/1990 | Soffer et al. | ................. | 359/559 |
| 5,111,490 A | * | 5/1992 | Drawert | ......................... | 378/4 |
| 5,138,647 A | | 8/1992 | Nguyen et al. | ............. | 378/189 |
| 5,233,541 A | * | 8/1993 | Corwin et al. | ............... | 364/516 |
| 5,239,567 A | * | 8/1993 | Loonen | ...................... | 378/98.2 |
| 5,262,649 A | | 11/1993 | Antonuk et al. | ........ | 250/370.09 |
| 5,278,645 A | * | 1/1994 | Lorenzo et al. | ............. | 348/164 |
| 5,319,786 A | * | 6/1994 | Yamamura | ................... | 345/115 |
| 5,408,996 A | * | 4/1995 | Salb | ............................. | 600/317 |
| 5,444,756 A | * | 8/1995 | Pai et al. | .................. | 378/98.8 |
| 5,457,754 A | * | 10/1995 | Han et al. | .................... | 382/128 |
| 5,542,003 A | * | 7/1996 | Wofford | ...................... | 382/132 |
| 5,568,192 A | * | 10/1996 | Hannah | ...................... | 348/222 |
| 5,751,848 A | * | 5/1998 | Farrell | ........................ | 382/172 |
| 5,776,063 A | * | 7/1998 | Dittrich et al. | ............. | 600/408 |

\* cited by examiner

Primary Examiner—Jayanti K. Patel

(57) ABSTRACT

An improved acquisition scheme for a medical imaging and treatment system 100. According to one aspect of the invention, adaptive radiation detection, for determining when therapeutic or diagnostic radiation is being applied, is provided. The imaging device 124 acquires several test images during a preacquisition delay. The maximum intensity level from these test images is defined as the upper limit of a camera 122's response in the darkness. The standard deviation of the intensity distribution is also computed. The image intensity level of the subsequent test images are compared to a radiation detection threshold which is determined to be the upper limit of the camera's dark signal, plus twice the standard deviation of pixel intensity distribution of the dark test images. If the intensities of a statistically significant number of pixels exceeds the threshold, the radiation is considered to be on. According to another aspect of the invention, a single look-up table is used for both the test images and the actual acquisition images. The single look-up table is downloaded upon detection of power to a linear accelerator 101. According to still another aspect of the present invention calibration of a lower bound of a signal of interest occurs using a histogram based algorithm, so that only the histogram needs to be transferred from the imaging board to the host computer. Furthermore, the present invention is capable of automatically calculating the upper bound of a signal of interest. In addition, the present invention is configured for continuous image integration such that each acquisition cycle is repeated until the linear accelerator 101 is turned off. Thus, the final image is the integration of images from each acquisition cycle.

39 Claims, 11 Drawing Sheets

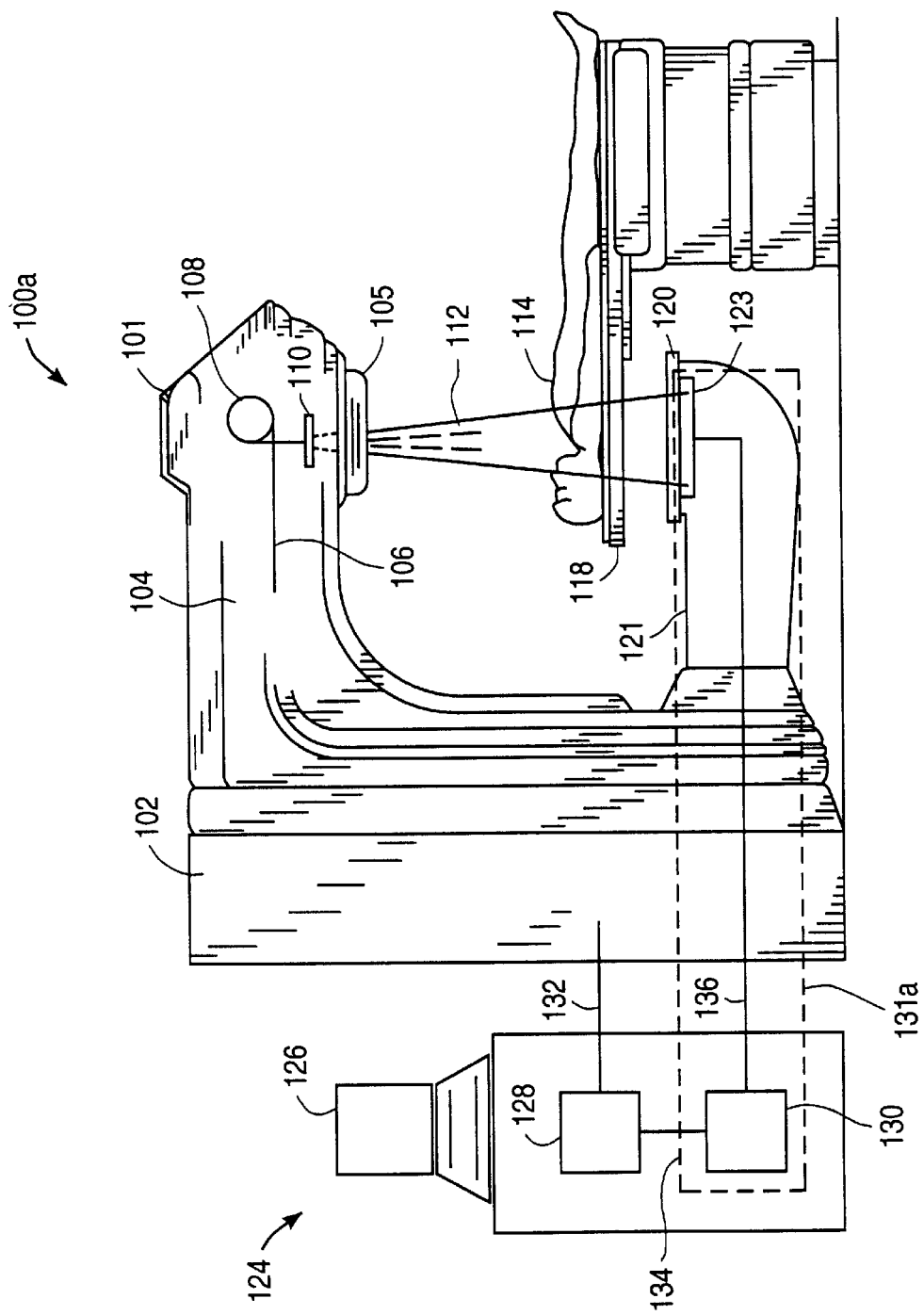
FIG_1A

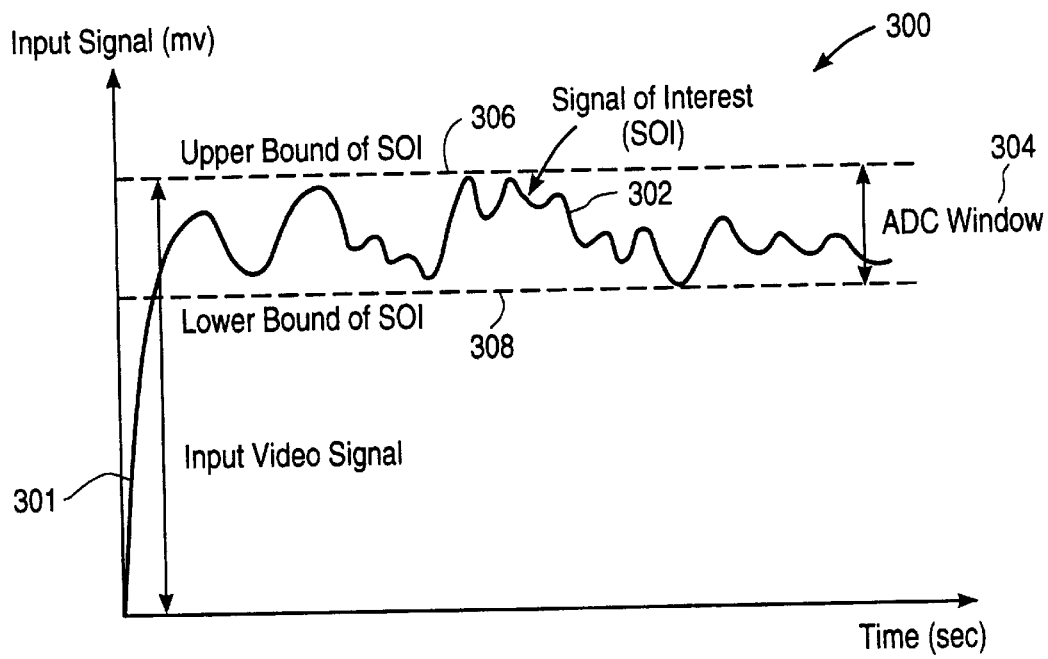
FIG_2
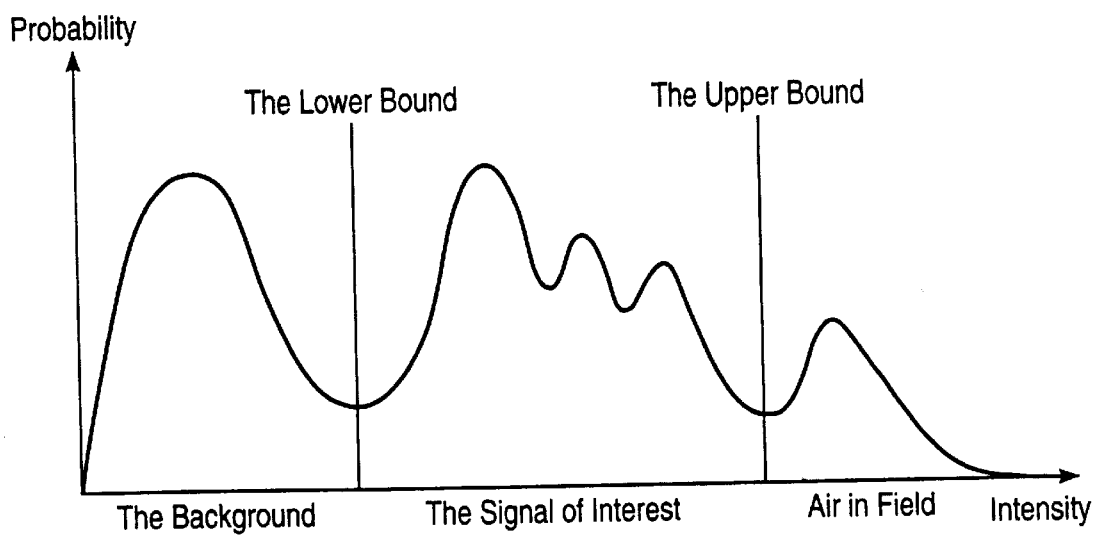
FIG_3

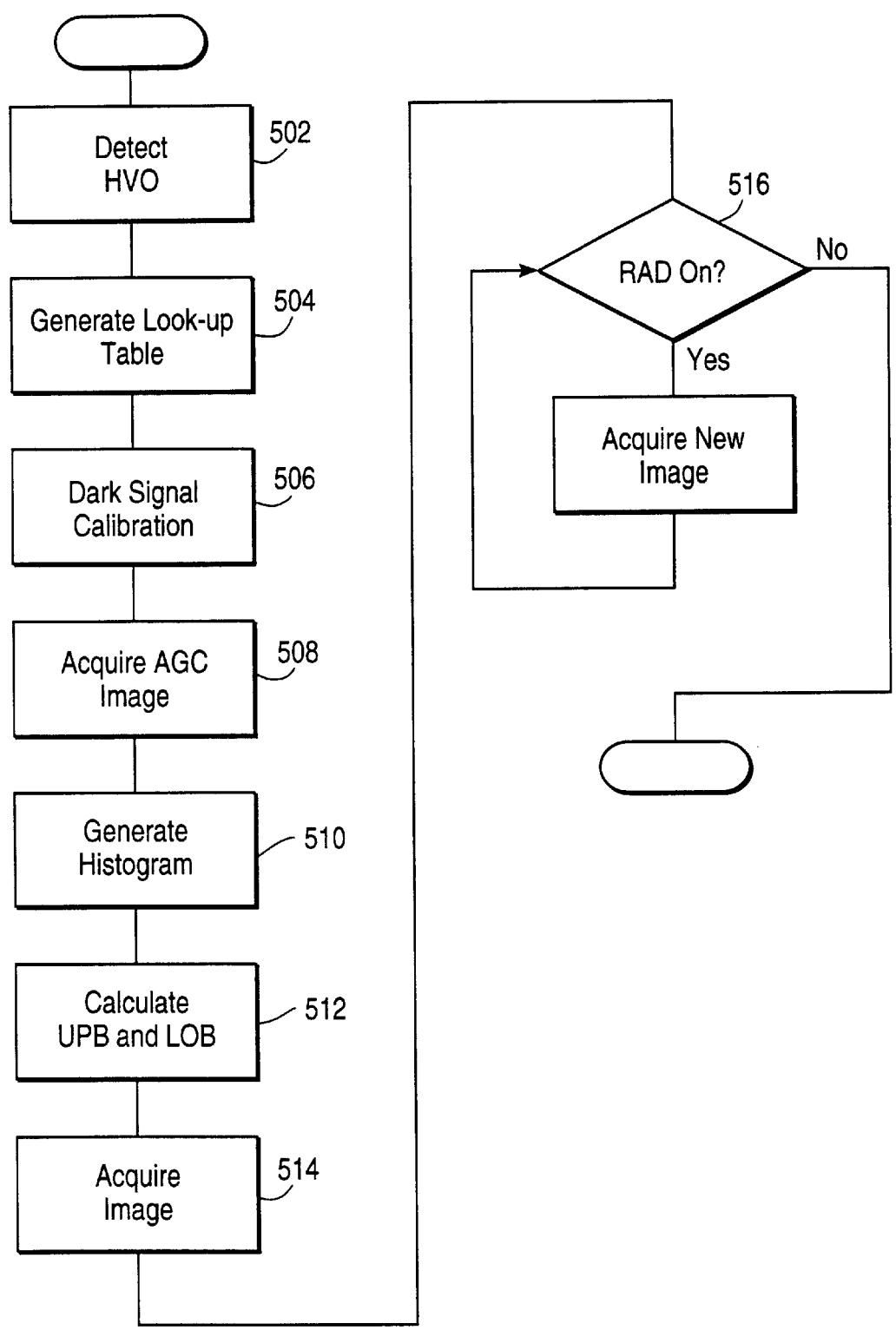
FIG_5

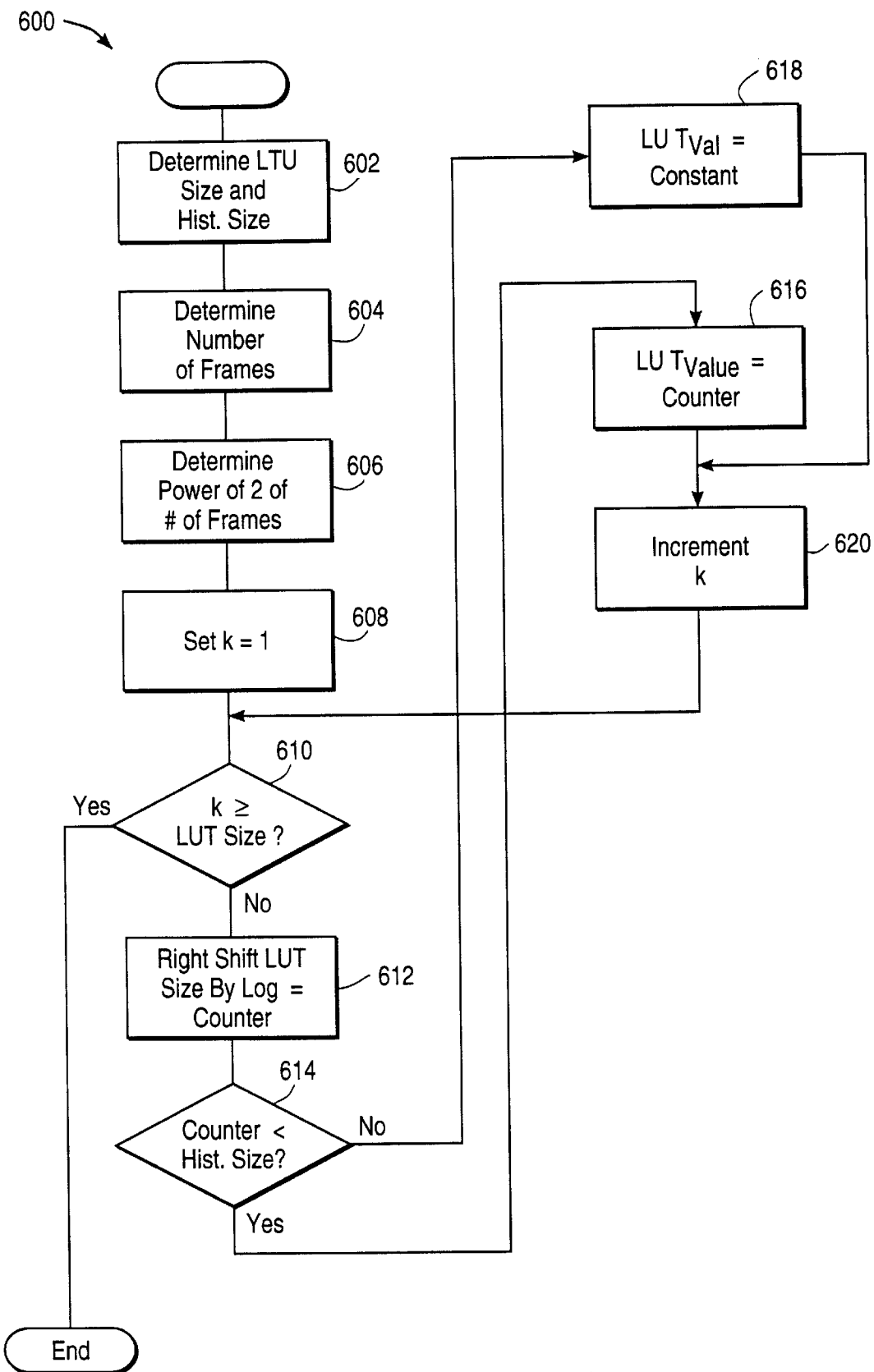
FIG_6

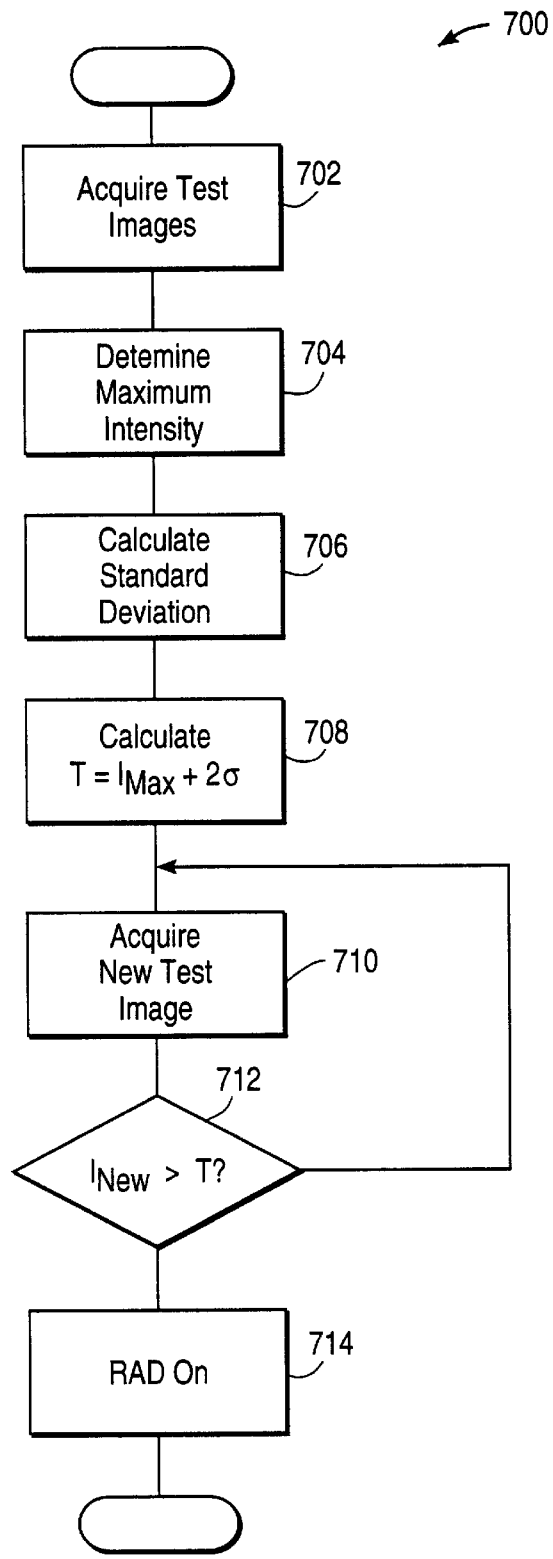
FIG_7

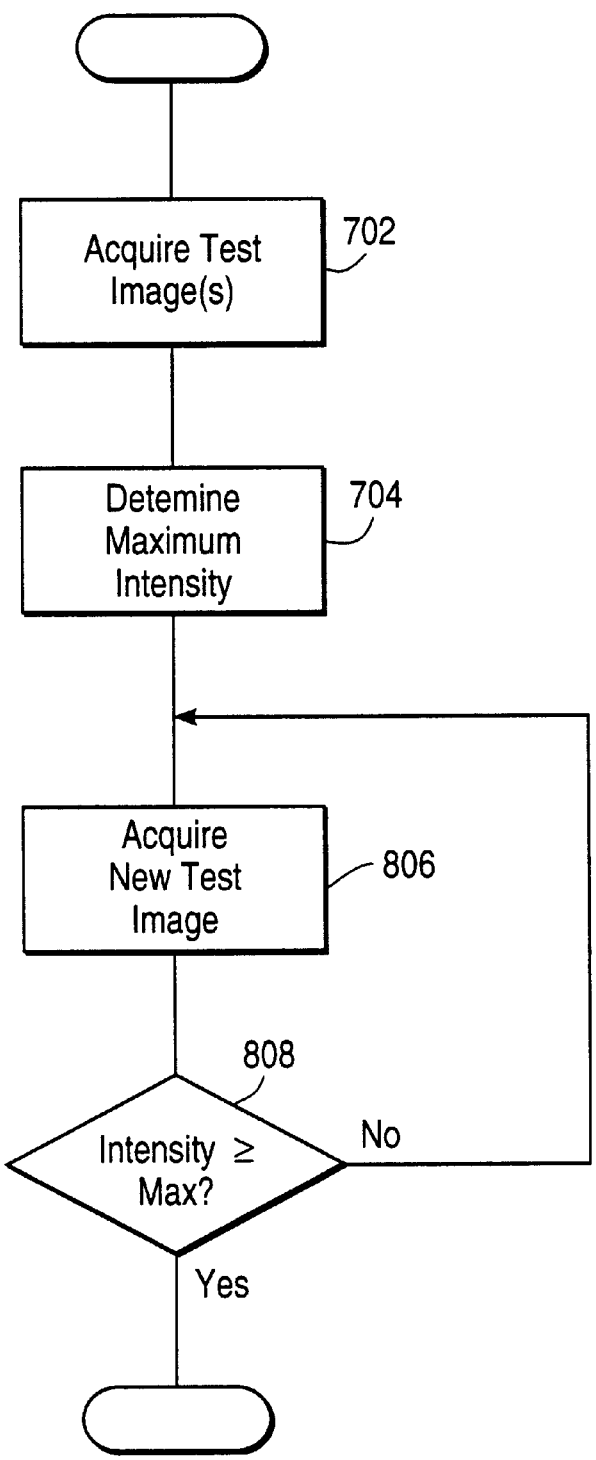
FIG_8

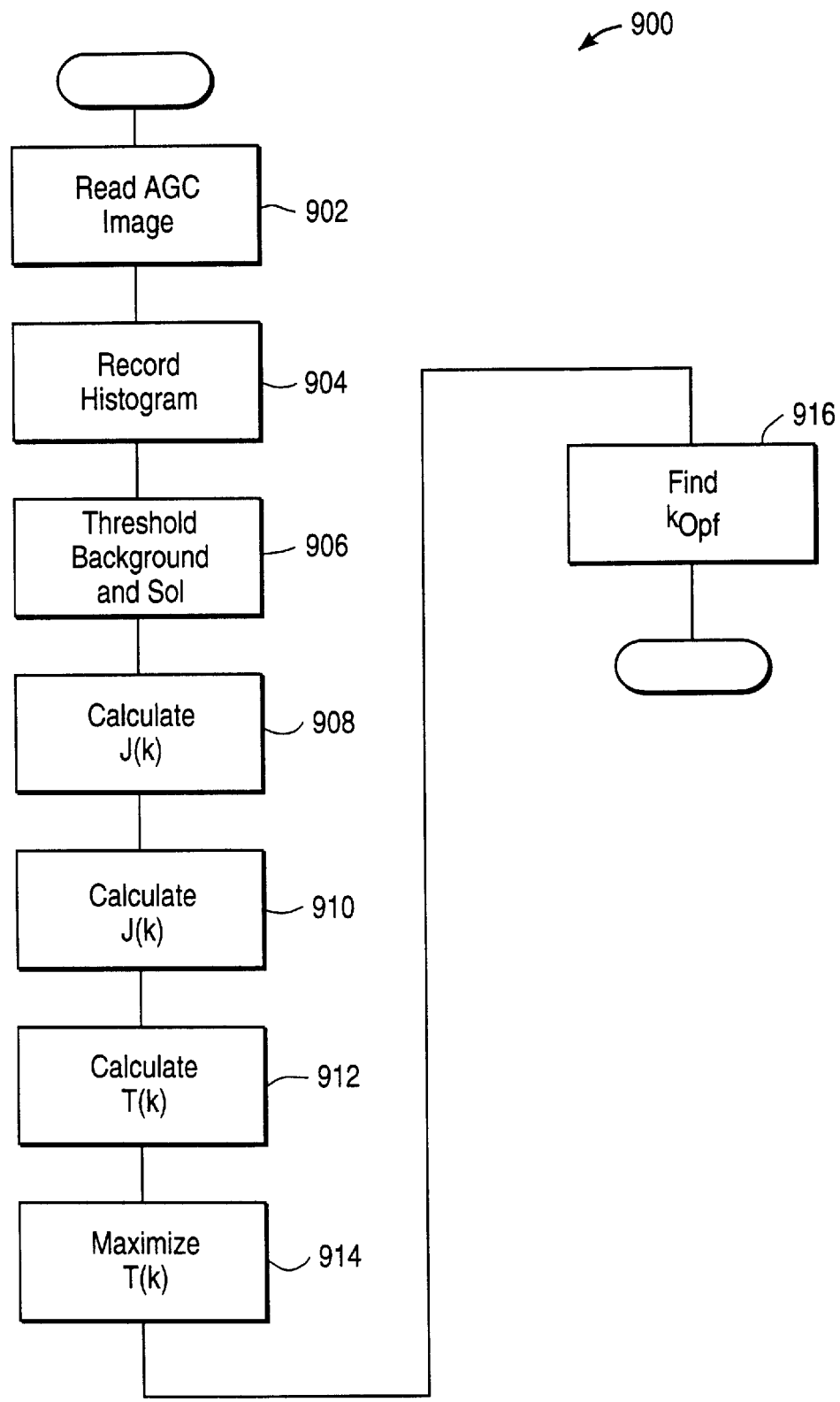
FIG_9

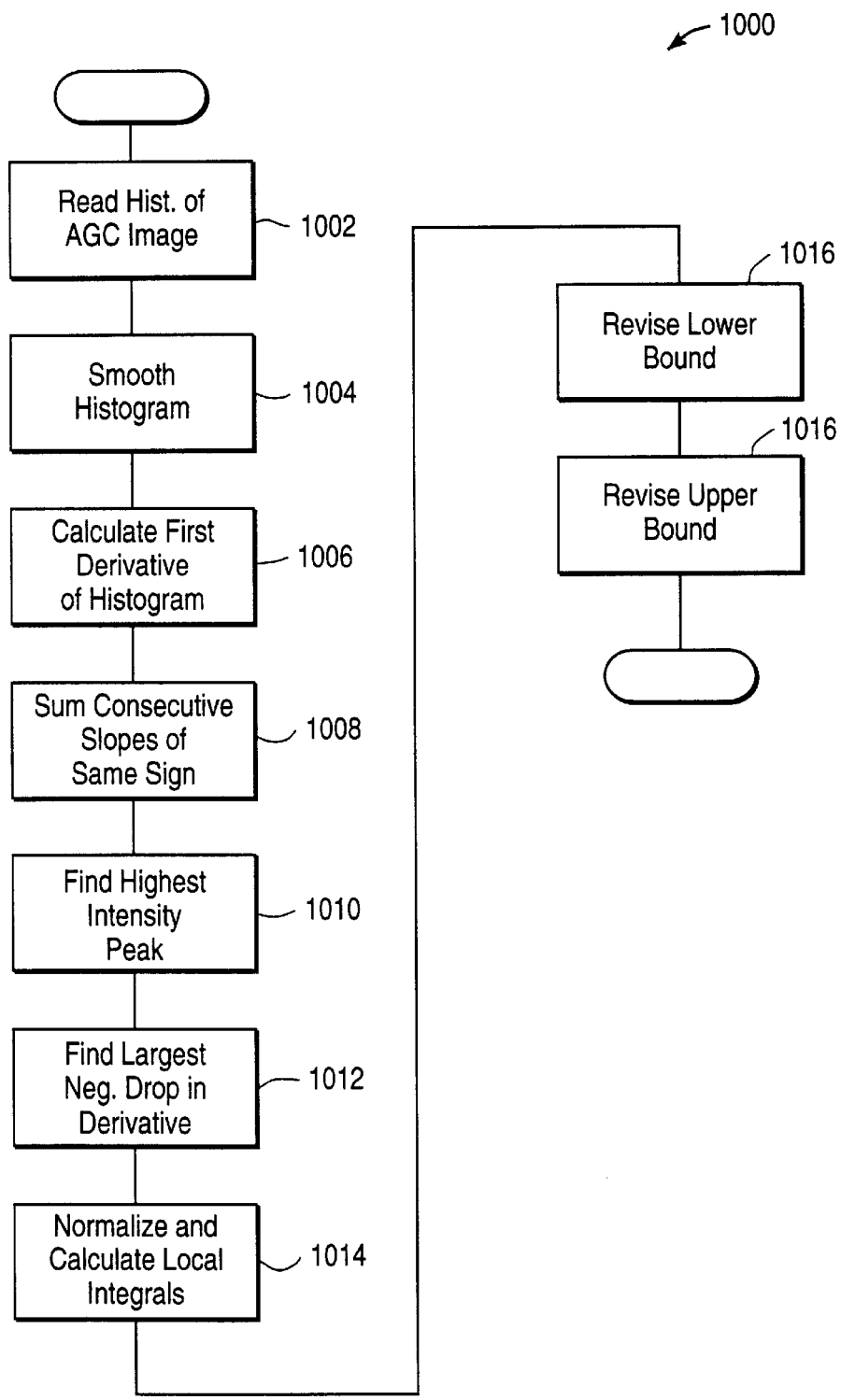
FIG_10

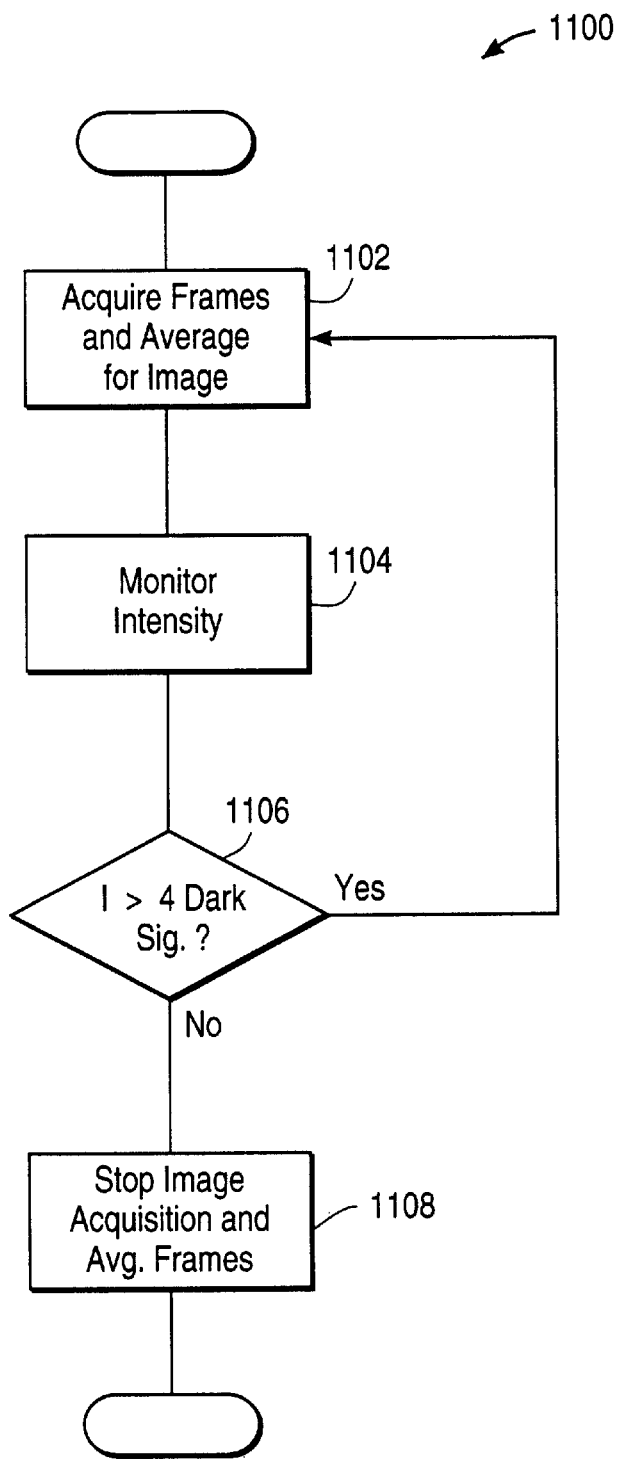
FIG_11

ACQUISITION SCHEME FOR AN ELECTRON PORTAL IMAGING SYSTEM

RESERVATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. A CD-ROM disc containing a computer program listing appendix is submitted and is herein incorporated by reference, CD-ROM contain a single text file created on Sep. 21, 2001 and format IBM-PC.

BACKGROUND OF THE INVENTION

1. Field of the Invention

The present invention relates to medical imaging systems, and more particularly to an improved acquisition scheme for an electronic portal imaging system.

2. Description of the Related Art

The use of linear accelerators for medical therapy is well known. Such linear accelerators are used for treating patients with radiation therapy, such as X-rays or electron beams. Such X-rays are created when high energy electrons are decelerated in a target material such as tungsten. Alternatively, the electrons themselves may be used directly for treatment. The major modules in a linear accelerator are a gantry with a treatment pad, a stand, a control console and a treatment couch. The stand is anchored firmly to the floor and the gantry rotates on bearings in the stand. The operational accelerator structure housed in the gantry rotates about a horizontal axis fixed by the stand for treatment of a patient lying on the treatment couch.

In the radiation therapy treatment of a patient, geometric accuracy is an important factor to the success of the treatment. One known method for local control of the delivery of radiation is a record and verify system which includes an imaging section for delivering an image using a fluoroscopic technique and an image processing unit for digitally processing the image. In the imaging section, a fluorescent screen converts images generated by the X-rays, which are emitted from the treatment head and then passed through the patient, into visible images. The visible images are then reflected to a video camera by a reflector in order to avoid irradiating the camera. In the image processing section, the video signals from the camera are digitally processed in real time for continuous monitoring of the treatment field throughout the treatment.

After the linear accelerator is turned on, there is a delay period, referred to as the acquisition delay, before the actual radiation beam is turned on. The imaging device typically detects the linear accelerator being turned on and begins the process of radiation detection (the linear accelerator's internal signal that ejects the electron beam is typically isolated from the imaging device). Radiation detection is accomplished by looping through the acquisition of several short duration test images and evaluating their intensity levels. Once the radiation levels exceed a predetermined threshold, the imaging device transitions to a process called automated gain control, to determine upper and lower bounds of a desired analog to digital convertor (ADC) window. During the automated gain control process, a test image referred to as the AGC image is acquired and analyzed, typically by a CPU remote from the imaging board, to identify the lower bound (LOB) of signals of interest (SOI) and the upper bound (UPB) of signals of interest. Once the ADC settings are calibrated they are downloaded to the imaging board along with other acquisition parameters. The imaging device then begins the acquisition of actual portal acquisition images.

The above described acquisition scheme suffers from several disadvantages. First, the radiation detection threshold is typically a predetermined hard coded value. Thus, radiation detection can be impaired by changes in camera sensitivity either through the aging of the electronics or through replacing one camera with another.

In addition, look-up table techniques are generally used to scale the image pixel values from 16-bit to 8-bit due to the nature of the imaging board and processor structure. The duration of a test image acquisition is 25% of that of a portal image acquisition. Accordingly, a first look-up table is typically employed for the test image and second look-up table is typically employed for the actual acquisition image. Because a new look-up table for the actual acquisition duration must be downloaded after the automated gain control setting of the ADC window, the video capturing operation must be turned off and be turned back on, a process which requires about one-half of one second. The use of the two look-up tables thus inserts an undesirable acquisition delay. Accordingly, it is desired to provide for image acquisition that minimizes or eliminates this delay.

The prior art also suffers from several disadvantages in identifying the LOB and UPB. As noted above, a test image is acquired to determine these bounds. The image has two or three segments: 1) the background with no radiation, 2) the treatment port where the radiation exists from the patient, and 3) the air in field where the radiation hits directly onto the detector screen. An air in field segment might not occur in every case. After the AGC image is acquired, its histogram is generated. The histogram, a probability versus intensity map, is used to define the lower bound between the background and the signal of interest. The upper bound or UPB is typically, by default, the maximum intensity level on the AGC image, unless "air in field" is manually identified by the user, in which case the UPB is empirically set to the maximum intensity minus 5% of the total intensity range. Because a user is required to identify whether or not an air in field situation exists, there exists a potential for errors in the determination of the bounds of the signal of interest. Accordingly, it is desirable to provide a method for calibrating the LOB and UPB automatically, and automatically determining a UPB regardless of whether an air in field situation exists.

In order to calibrate the LOB, imaging systems typically are required to transfer both the AGC image and its histogram from the imaging board to the host computer. This transfer time is typically on the order of about 200 milliseconds, another undesirable delay. Still others transfer only the AGC image. However, since the AGC image is much larger than the histogram, undesired delay can result. Accordingly, it is desirable to provide a method for calibrating the LOB and UPB while eliminating the requirement of transferring both the AGC image and its histogram. Additionally, it is desirable to provide such a method using only the histogram.

Finally, in typical prior imaging systems, the image acquisition duration is typically independent of the radiation duration. Thus, if an acquisition is completed before the radiation treatment is finished, the rest of the radiation is wasted. Accordingly, it is desirable to provide a method to continue the acquisition until after the linear accelerator is turned off to insure maximum imaging efficiency and possibly improving the image's statistical quality.

SUMMARY OF THE INVENTION

Accordingly, there is provided an improved acquisition system and method for a medical imaging system. According to one aspect of the invention, adaptive radiation detection is provided. The imaging device acquires several test images during a preacquisition delay. The intensity of the test images is used to determine whether the radiation is turned on. The maximum intensity level from these test images is defined as the upper limit of a camera's response in the darkness. The standard deviation of the intensity distribution is also computed. The image intensity level of the subsequent test images are compared to a radiation detection threshold which is determined to be the upper limit of the camera's dark signal, plus twice the standard deviation of pixel intensity distribution of the dark test images. If the intensities of a statistically significant number of pixels exceeds the threshold, the radiation is considered to be on.

According to another aspect of the invention, a single look-up table is used for both the test images and the actual acquisition images. The single look-up table is downloaded upon detection of power to a linear accelerator. According to still another aspect of the present invention, calibration of a lower bound of a signal of interest occurs using a histogram-based algorithm, so that only the histogram needs to be transferred from the imaging board to the host computer. Furthermore, the present invention is capable of automatically calculating the upper bound of a signal of interest, without requiring a user to input whether an air-in-filed situation exists. In addition, the present invention is configured for continuous image integration such that each acquisition cycle is repeated until the linear accelerator is turned off. Thus, the final image is the integration of images from each acquisition cycle.

According to another embodiment of the present invention, the upper and lower bounds of a signal of interest are automatically determined from the histogram of one or more of a series of test images. More particularly, a first derivative of the histogram is calculated. The first derivative is used to determine a first approximation to the lower bound, which is defined to be the location of the largest negative drop in the first derivative. A first approximation to the upper bound is also determined, which is defined to be the location of the maximum intensity level. Successive local integrals are then calculated. The lower bound is revised upward from the preliminary lower bound based in part on a value of the local integrals. The upper bound is similarly revised downward, also based in part on a value of the local integrals.

BRIEF DESCRIPTION OF THE DRAWINGS

A better understanding of the present invention is obtained when the following detailed description is considered in conjunction with the following drawings in which:

FIG. 1A is a block diagram of a linear accelerator and flat panel based portal imaging device according to an embodiment of the present invention;

FIG. 2 is an exemplary ADC window;

FIG. 3 is an exemplary ADC window histogram;

FIG. 5 is a flowchart of an enhanced image acquisition process according to an embodiment of the present invention;

FIG. 6 is a flowchart of look up table generation according to one embodiment of the present invention;

FIG. 7 is a flowchart of an enhanced dark signal calibration technique according to an embodiment of the present invention;

FIG. 8 is a flowchart of an enhanced dark signal calibration technique according to an embodiment of the present invention;

FIG. 9 is a flowchart of an enhanced automated gain control technique according to an embodiment of the present invention;

FIG. 10 is a flowchart of an enhanced automated gain control technique according to an embodiment of the present invention; and FIG. 11 is a flowchart of an enhanced automated gain control technique according to an embodiment of the present invention.

DETAILED DESCRIPTION OF THE INVENTION

Figure 1:
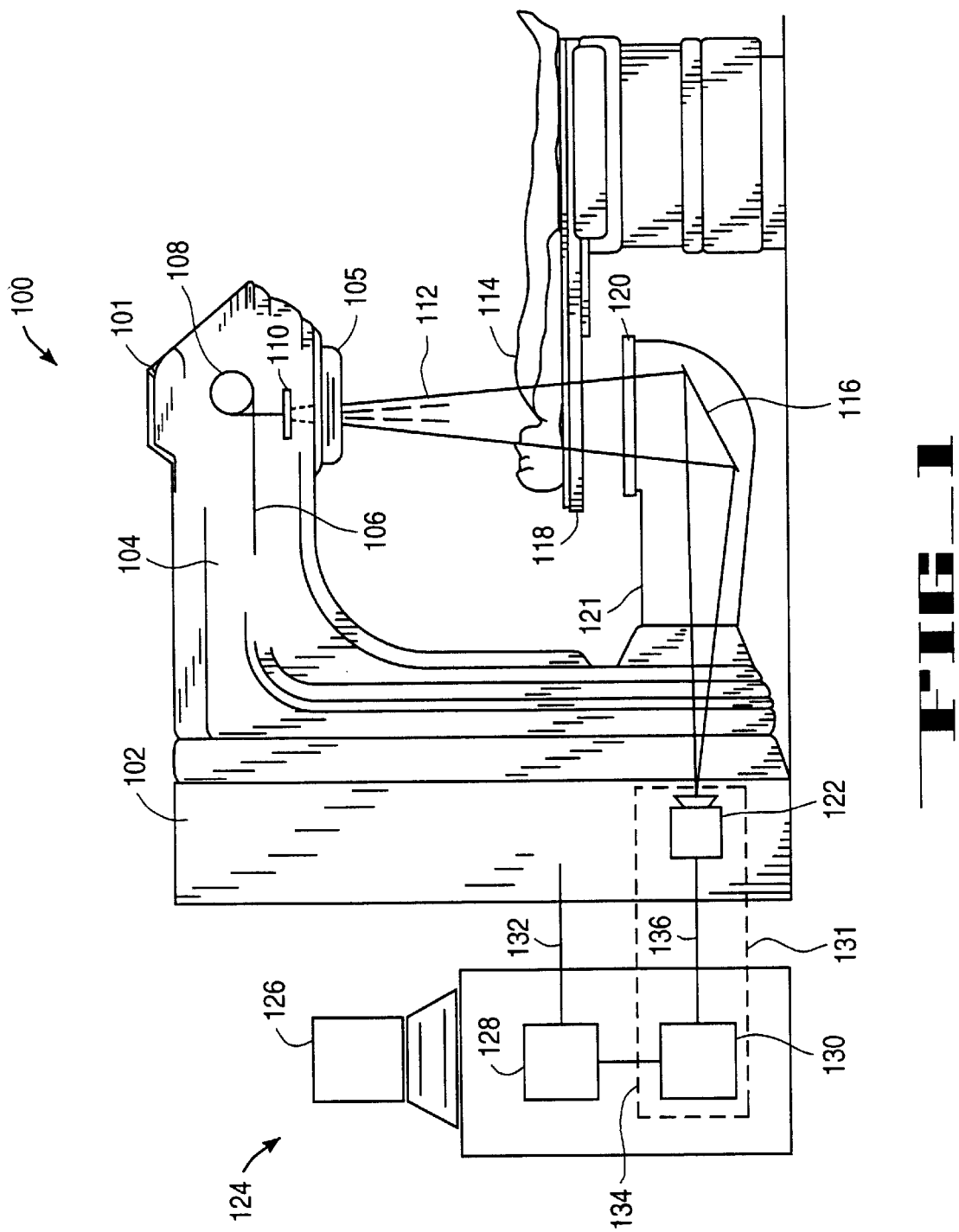
FIG. 1 is a block diagram of a linear accelerator and camera based portal imaging device according to an embodiment of the present invention.

FIG. 1—Linear Accelerator and Camera Based Portal Imaging Device

Turning now to FIG. 1, a medical treatment and imaging system 100 is shown. Treatment and imaging system 100 comprises an improved system and method for calibrating and acquiring tomographic images.

Treatment and imaging system 100 includes a linear accelerator or radiation therapy apparatus 101 and an imaging station 124. Linear accelerator or radiation therapy apparatus 101 includes a stand 102 anchoring linear accelerator 101 to the floor. Stand 102 supports a gantry 104 including a treatment head 105. Gantry 104 can be rotated about a horizontal axis (not shown). Treatment head 105 emits the treatment beam 112, which might be an X-ray beam or an electron beam. The X-rays are of penetrating power and used for the treatment of deep-seated tumors, whereas the electrons themselves may be used directly to treat more superficial cancers. The patient 114 rests on a treatment couch 118. Gantry 104 includes a wave guide 106 for directing the electrons or X-rays through treatment head 105 to the patient 114.

Stand 102 includes an electron injector (not shown) which supplies injector pulses from an electron gun (not shown) arranged in gantry 104. Electrons are emitted from the electron gun into the evacuated wave guide 106 for acceleration. An electromagnetic field supplied to the wave guide accelerates the electrons emitted by the electron gun for forming an electron beam. In treatment head 105, the electron beam enters an evacuated envelope which bends the electron beam by 270° (i.e., bending magnet 108). The electron beam then leaves the envelope through a window (not shown). If electron radiation is to be generated, a scattering foil (not shown) is moved into the trajectory of the electron beam; if X-ray radiation is to be generated a target 110 is moved into the trajectory. The energy level of the electron beam is caused to be higher than during generation of the electron radiation because more energy is necessary for generating X-ray radiation due to deceleration of the electrons in the target.

An imaging housing 121 is positioned such that a metal foil scintillation detector or image converter 120 is positioned in opposition to treatment head 105. Imaging housing 121 is operably coupled to imaging station 124, to allow radiation treatment simultaneously with visualization of the patient's anatomy (typically, on video screen 126) within the X-ray radiation beam. Metal foil scintillation detector or image convertor 120 comprises one or more heavy metal and/or thin fluorescent foils. After passing through the patient's body, the X-rays impinge first on the metal foil and create electrons. In the fluorescent foil, the X-rays and the electrons emitted from the metal foil stimulate the generation of visible light. By use of the metal foil, the light output of the fluorescent foil is increased such that the generated X-ray images provide adequate contrast. The visible light emitted from the fluorescent foil is transmitted via a reflector 116, preferably angled at 45°, to a visible light sensitive video camera 122 positioned inside the treatment apparatus 101.

Video camera 122 is preferably a tube-based Newvicon camera situated at the end of the optical path. The camera is typically capable of capturing 30 frames per second, each frame having a size of 512×480 pixels. The video camera is coupled by way of a connector 136 to an imaging or video capturing board 130. Connector cable 136 is preferably an RS-170 connector. The imaging or video capturing board 130 preferably includes an ICS 225 video capturing chip. Video camera 122 and imaging board 130 collectively comprise a video interface 131.

More specifically, imaging board 130 includes a built-in 8 bit analog to digital convertor (ADC) configured to receive the analog camera signal. The imaging board 130 also includes two 64 step linear adjustable reference settings for setting the ADC window lower bound and upper bound. Imaging board 130 is additionally provided with a 16 bit averaging frame integration buffer, preferably for storing up to 256 frames per image. Imaging board 130 also includes a customer-definable scale look-up table (LUT) to convert the 16-bit buffer into 8-bit output images. A 256-level image histogramming apparatus is included on imaging board 130.

Video capturing board 130 is coupled by way of an 6U VME bus 134 to a controller board 128, which includes a host processor (not shown), in host computer 126. Controller board 128 comprises a video processing circuit for identifying the upper and lower bounds of the signals of interest, as well as other video processing tasks.

More specifically, controller board 128 preferably includes a Force 2CE or Force 5V-based mother board running the Sun OS 4.1.X operating system. Host board 128 couples to treatment device 101 via an RS-232 serial link 132 in order to receive a signal indicative of power being supplied to the treatment machine 101. According to one embodiment, the system 100 includes improved adaptive radiation detection techniques, automated gain control, and continuous image integration, as will be described in greater detail below.

FIG. 1A—Flat Panel Imaging System

Turning now to FIG. 1A, a block diagram illustrating a flat panel based portal imaging system is shown. The imaging system is generally similar to that shown in FIG. 1; components common to FIG. 1 retain the same reference numerals.

The imaging system illustrated in FIG. 1A includes a flat panel detector 123 comprising one or more arrays of a plurality of photosensitive sensors disposed beneath converter 120 such that visible light impinges on the photosensitive sensors. The photosensitive sensors are arranged in rows and columns and are paired with thin film field effect transistors. This imaging signal creates electron-hole pairs which are stored in the capacitance of the detectors. The signal is then processed, as will be discussed in greater detail below. Further details of flat panel detector arrays may be obtained from Antonuk et al., U.S. Pat. No. 5,262,649, which is hereby incorporated by reference in its entirety as if fully set forth herein.

FIG. 2 and FIG. 3—Exemplary ADC Window and Histogram

Turning now to FIG. 2, an exemplary ADC window 304 is illustrated. More particularly, FIG. 2 illustrates a graph 300 of an input video signal 301 (preferably in millivolts) vs. time (preferably in seconds). Input video signal 301 ramps rapidly to its steady state within the ADC window 304. The signal of interest 302, which is a portion of the input video signal 301, has an upper bound 306 and a lower bound 308. The ADC window 304 is determined to be bounded within the upper and lower bounds of the signal of interest. The signal of interest, i.e., a test or actual image, has either two or three components. The first component is a background component in which no radiation impinges on a particularized portion of the scintillation screen 120. Another segment of the image is the actual treatment portion where the radiation exists from the patient. Finally, there may exist an air-in-field (AIF) segment in which radiation directly strikes the detector or the scintillation screen. The AIF signal may not appear in every case.

Turning now to FIG. 3, an exemplary histogram of the signal of interest (SOI) (e.g., a body) is illustrated. More particularly, the histogram illustrates probability versus intensity (i.e., pixels per unit area). The background segment occupies the lowest intensity range with the signal of interest occupying a slightly higher intensity range. If an AIF signal exists, it occupies the highest intensity range. Both the background and the AIF have fairly homogeneous intensity distributions which can be identified as approximately normal distributions on either side of the SOI histogram. Thus, the SOI is bordered between the maximum level of the background and the minimum level of the AIF.

Figure 4:
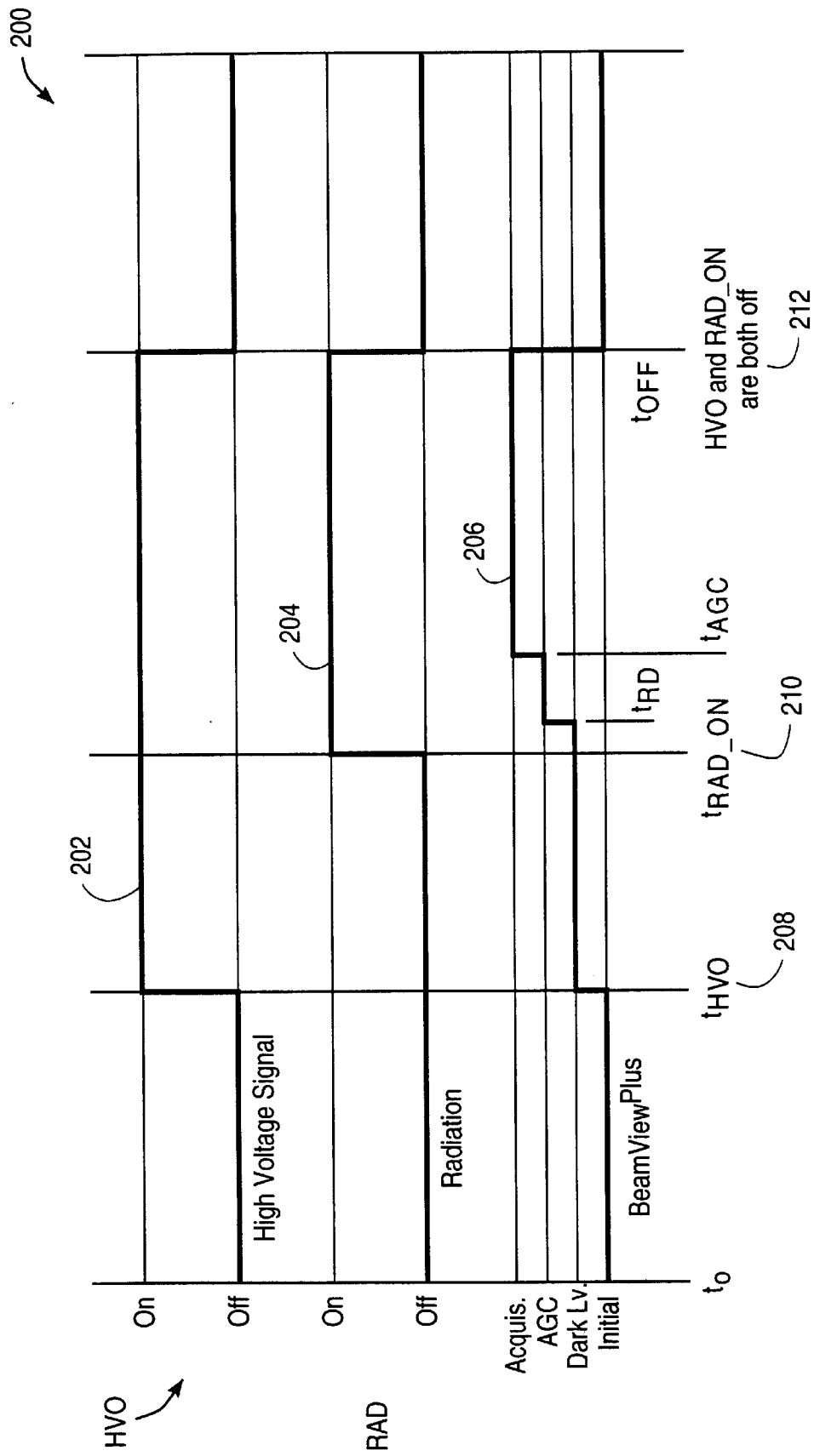
FIG. 4 is a general schematic of an imaging device acquisition procedure.

FIG. 4—Schematic of Imaging Device Acquisition Procedure

Turning now to FIG. 4, a schematic 200 of the acquisition procedure is illustrated. Schematic 200 includes a high voltage signal representation 202, a radiation signal representation 204, and an acquisition signal representation 206. Initially, at time $t_0$, the high voltage signal 202 and the radiation 204 and the imaging device are off. At time $t_{HVO}$ (i.e., when the machine is turned on), the high voltage signal 202 jumps to ON to indicate that power has been supplied to the treatment device 101.

During the time period between $t_{HVO}$ and $t_{rad\_on}$, the imaging device detects HVO and begins the process of radiation detection by looping through the acquisition of several short duration test images and evaluating their intensity levels. More particularly, between $t_{HVO}$ and $t_{rad\_on}$ the imaging device determines the maximum intensity level from the series of test images. The maximum intensity level is the upper limit of the camera's response in the darkness. In one embodiment, the standard deviation of the intensity distribution is computed. An empirically determined threshold, defined as the upper limit of the camera's dark signal plus twice the standard deviation of the pixel intensity distribution of the dark images, is used to compute a radiation detection threshold. The image intensity level of test images is compared to the radiation detection threshold. Other thresholds, not employing the standard deviation, may be employed. If the intensities of a statistically significant number of pixels in that particular test image exceed the threshold, the radiation is considered to be turned on. Turning back to FIG. 4, the radiation is turned on at time $t_{rad\_on}$. At time $t_{rd}$, the imaging device determines that the radiation has been turned on.

Once the dark signal has been calibrated and radiation detected as being on, the imaging device begins the process of automated gain control to determine the upper and lower bounds of the signal of interest for calibrating the ADC window. In one embodiment, a local thresholding method using two consecutive two-class thresholding steps using a histogram of local portions of the AGC image are employed to determine the upper and lower bounds of the ADC window. Alternatively, a process using a derivative of the histogram is employed. These processes are described in more detail below.

Once the upper and lower bounds are determined at $t_{agc}$, actual portal image acquisition begins. Image acquisition continues until radiation and the high voltage signal are turned off at $t_{off}$. More particularly, as will be explained in greater detail below, an embodiment of the present invention continues to acquire images throughout the application of the radiation.

FIG. 5—Flowchart of Enhanced Image Acquisition Process

Turning now to FIG. 5, a flowchart illustrating the image acquisition process according to one embodiment of the present invention is illustrated. More particularly, the imaging device will first detect HVO (step 502). Preferably this is accomplished by the host board 128 receiving a signal along RS-232 interface 132. Next, the appropriate look-up table is calculated at the CPU and downloaded to the imaging board (step 504). The look-up table is used to scale image pixel values for transmission along the 8-bit interface from the video capture board to the video processing board. Details concerning the look-up table are described below.

Once the appropriate look-up table has been downloaded, test images are acquired and the dark signal calibration (i.e., calibration of the camera or other imaging device's response in the darkness) occurs. It is noted that the test images preferably comprise only a quarter of the intensity range of the portal image (step 506). Once the dark signal calibration has occurred, the dark signal response is used to determine whether radiation is turned on.

Once radiation has been detected, the imaging device acquires the automated gain control (AGC) image (Step 508). The AGC image's histogram is used to determine the upper and lower bounds of the ADC window. The AGC image, like the other test images, has an intensity range of one-fourth of that of the portal images. Once the AGC image is acquired, its histogram is determined, uploaded to the host processor, and the UPB and LOB are calculated from the histogram (steps 508–512). Upon calculation of the LOB and UPB in the host processor, the ADC window reference settings are downloaded to the imaging board along with the setting for acquisition duration. The acquisition starts immediately thereafter (step 514).

Once the portal image has been acquired, if radiation is determined to still be emitted (Step 516), another image is acquired (step 518). New images are acquired so long as radiation is detected. Once radiation is no longer being detected, acquisition stops and the images are integrated on the host computer into the final image.

FIG. 6—Flowchart of Look-up Table Generation

Turning now to FIG. 6, a flowchart illustrating the look-up table generation is shown. Source code relating to the look-up table appears in the Appendix.

The source code in the Appendix is contained on a CD-ROM and is incorporated by reference. The CD-ROM contains the following files:

| Name of file | Size (bytes) | Date of creation |
|---|---|---|
| Bv_das_stat.c | 16 kb | 1996 |
| Bv-das_calc.c | 14 kb | 1996 |
| Bv_das_ctrl.c | 24 kb | 1996 |
| Bv_das_main.c | 4 kb | 1996 |
| Bv_das_apis.c | 3 kb | 1996 |
| Icslib.c | 17 kb | 1996 |
| Bv_das.h | 2 kb | 1996 |
| Bv_das_rpc.h | 1 kb | 1996 |
| Bv_das_srv.h | 1 kb | 1996 |
| Bv_das_ics225.h | 3 kb | 1996 |
| Bv_acq.h | 2 kb | 1996 |
| Bv_acq.rpc | 24 kb | 1996 |
| Bv_acq_apis.c | 5 kb | 1996 |
| Bv_acq_client.c | 683 kb | 1996 |
| Bv_acq.ctrl.c | 24 kb | 1996 |
| Bv_acq_main.c | 3 kb | 1996 |
| Bv_acq_rpc.h | 1 kb | 1996 |
| Bv_acq_rpc_cln.c | 9 kb | 1996 |
| Bv_acq_rpc_defs.h | 2 kb | 1996 |
| Bv_acq_rpc_srv.c | 9 kb | 1996 |
| Bv_acq_stat.c | 17 kb | 1996 |
| Bv_das.rpv | 907 b | 1996 |
| Db_das.h | 4 kb | 1996 |
| Vidcmds.h | 5 kb | 1996 |
| Vidregs.h | 5 kb | 1996 |

All the above files are contained on one CD-ROM ("Copy 1") and an identical copy of the CD-ROM is contained the additional CD-ROM ("Copy 2").

The look-up table is downloaded at the beginning of the acquisition process and is used for both the test and actual portal images. The look-up table is used to scale the image pixel value from 16-bits to 8-bits for transmission across the VME bus. It is noted that in alternate architectures no look-up table is required because no 16-bit to 8-bit scaling is required. A portal image preferably comprises 16 or 32 frames; a setup or test image comprises 4 or 8 frames or one-fourth of the number of frames for a portal image. As noted above, the same lookup table is employed for both test and actual images.

The process 600 for generating the look-up table begins with the reception of the look-up table size and the histogram size (Step 602). In addition, the number of frames averaged in an image is received as an input (Step 604). The number of frames is preferably a power of two. The LUT routine determines which power (i.e., determines the logarithm)(Step 606). Next, a counter value is initialized at 1 (Step 608). The counter value will cycle through each place in the look-up table, as will be described in greater detail below. Once the counter is incremented to equal the look-up table size, the process halts (Step 610).

So long as the counter value is less than the histogram size as determined in step 610, however, the counter value is right shifted a number of times equal to the logarithm to the base 2 of the number of frames (Step 612). If the right shifted counter value is less than the histogram size (Step 614), the look up table at the location corresponding to the counter value receives the right-shifted counter value (Step 616). If, however, in step 614, the right shifted counter value was greater than the histogram size, the look up table at the corresponding location receives a constant value (Step 618).

FIG. 7—Dark Signal Calibration Employing Standard Deviation Threshold

Turning now to FIG. 7, a flowchart illustrating dark signal calibration and radiation detection according to one embodiment of the present invention is illustrated. Th dark signal—the imaging device's response in the darkness—is initially calibrated. Then, the dark signal is used to determine whether radiation is turned on.

More particularly, as discussed above, once the high voltage on (HVO) signal is received, the imaging device begins acquisition of a series of test images (step 702). A maximum intensity level is then determined using the sequence of test images (step 704). In addition, the standard deviation of the intensity distribution is determined (step 706). Once both the maximum intensity level and the standard deviation have been calculated, a threshold is determined (step 708). More particularly, the threshold is empirically defined to be a maximum level plus twice the standard deviation, according to the equation set forth below:

$$T = I_{max} + 2\sigma$$

Once the threshold has been calculated, another test image is acquired (step 710). The maximum intensity of the new test image is compared against the threshold (step 712). If the intensity of the new test image is greater than the threshold, radiation is interpreted as turned on (step 714), and processing of the upper and lower bounds of the ADC window occurs. If however, in step 712, the intensity level of the new test image is determined to be less than the threshold, another test image would be required and its intensity compared to the threshold once more. The process continues until the intensity of the test image is greater than the threshold intensity.

FIG. 8—Dark Signal Calibration Employing Alternate Threshold

Turning now to FIG. 8, a flowchart illustrating dark signal calibration and radiation detection employing an alternate thresholding method is shown. Source code relating to this embodiment appears in the Appendix.

Initially, as above, a sequence of test images is acquired (step 802). The intensity of each of the test images as determined by the maximum intensity level of these test images is defined as the maximum dark signal (step 804). At least one subsequent image is acquired and its intensity is compared to the maximum dark signal intensity level (Step 806). If the intensity level is equal to the maximum dark signal intensity, then the radiation will have been determined to be turned on (step 808).

FIG. 9—Automated Gain Control Using Adaptive Local Thresholding

According to one embodiment of the invention, as noted above, two consecutive two-class thresholding steps are used to determine the upper and lower bounds of the signal of interest for the analog-to-digital converter window. More particularly, the body regions (i.e., the SOI) are first separated from the background in a "global" histogram using a first two-class thresholding technique.

As noted above, the background is typically at the lowest intensity range of the global histogram. This low intensity background region is then ignored. More particularly, it is assumed that background pixels always surround the object defining the SOI, and that they form one or more connected regions within predetermined image boundaries. Similarly, it is assumed that the background pixels always have the lowest intensities in the image.

The background is then separated from the SOI in the following manner: First, all pixels having an intensity less than a predetermined threshold are identified. The clustering, or positions of these pixels within the image, is determined. More particularly, pixels are classified according to whether they "touch" the image boundary, or are contiguous with pixels that touch the boundary. These pixels are identified as the background; pixels that are not contiguous with boundary pixels are considered to be part of the image. The pixel value of the boundary and contiguous pixels, however, is reset so that the next histogram calculation will ignore them. A second thresholding technique is employed on the remaining pixels to separate the SOI pixels from the AIF pixels, if AIF pixels are present. Adaptive local thresholding according to this embodiment of the present invention obviates the need to know whether the AIF pixels are present.

More particularly, once the background has been separated, the remaining pixels in the distribution are analyzed to determine an appropriate threshold, if one exists. More particularly, let $p(x)$ be the intensity distribution of a digital image in the range $[1, L]$ in relative units. A threshold $k$ $[1, L]$ divides the image into two classes $C_1([1, \ldots, k])$ and $C_2([k+1, \ldots, L])$. The following statistics may be calculated:

1) The probabilities of class occurrence are:

$$\omega_1 = \sum_{i=1}^{k} p(i) \quad \omega_2 = \sum_{L=k+1}^{L} p(i)$$

2) The class means are:

$$\bar{i}_1(k) = \frac{1}{\omega_1} \sum_{L=1}^{k} ip(i) \quad \bar{i}_2(k) = \frac{1}{\omega_2} \sum_{i=k+1}^{L} ip(i)$$

3) The class variances are:

$$\sigma_1^2 = \frac{1}{\omega_1} \sum_{L=1}^{ki} [i - \bar{I}_1(k)]^2 p(i) \quad \sigma_2^2(k) \frac{1}{\omega_2} \sum_{L+k=1}^{L} [i - \bar{i}_2(k)]^2 p(i)$$

4) The mean of the entire image is:

$$\bar{i}_T = \sum_{L=1}^{L} ip(i)$$

Two methods have typically been used to calculate thresholds. The first is called "maximum discriminant thresholding", and maximizes the between-class or interclass variances:

$$v(k) = \sigma^2(k) = \sum_{C=1,2} \omega(k)[\overline{I_C}(k) - \overline{I_T}]^2$$

When maximized, the above function yields the threshold $k_{MD}$.

A second method is referred to as "minimum error thresholding" and is based on the assumption that each class is a normal distribution. The following function has been defined:

$$J(k) = \omega_1(k)\log\left[\frac{\sigma_1(k)}{\omega_1(k)}\right] + \omega_2(k)\log\left[\frac{\sigma_2(k)}{\omega_2(k)}\right]$$

When this function is minimized, a threshold $k_{ME}$ is found.

It is noted that k can be anywhere between [1, ... L] on a digitized transmission image ranging from $[\mu_{min}, \mu_{max}]$ (cm$^{-1}$). Without loss of generality, k may be scaled back into its original units (cm$^{-1}$) in the range $[\mu_{min}, \mu_{max}]$, or any subset of this range. For example, $\mu$ may be searched only up to the maximum of the AIF distribution, $\mu_{AIF}$.

The maximum discriminant and minimum error thresholding techniques yield similar thresholds if the image is equally, or nearly equally, populated by the two pixel classes. However, when one class greatly outnumbers the other, the two techniques yield dramatically different thresholds. Accordingly, a technique according to an embodiment of the present invention employs a combination of minimum error and maximum discriminant thresholding. More particularly, a function T(k) is defined as set forth below:

$$T(k) = \frac{\log[v(k) + 1]}{J(k)}$$

The logarithm of $v(k)$ is employed to provide symmetry in the magnitude of the functions. A single maximum for T(k) is found, which results in an optimal threshold $k_{opt}$:

$$T(k_{opt}) = \max_{\mu_{min} \leq k \leq \mu_M} T(k)$$

The above function results in a optimum threshold regardless of whether the pixel distributions are balanced or unbalanced. It is noted that various post-segmentation processing techniques may be employed, such as weighted averaging and image smoothing.

Turning now to FIG. 9, a flowchart 900 illustrating automated gain control according to the system described above use illustrated. More particularly, once radiation has been detected, and dark signal calibration occurs, the AGC image is read (step 902). From the pixel intensity levels of the AGC a histogram is generated (step 904). Once the histogram has been generated, it is used to determined to the upper and lower bounds of the signals of interest. A thresholding technique is used initially to separate the signal of interest from the background (step 906). This has the effect of generating or identifying the lower bound between the background and the signal of interest. Once the signal of interest has been separated from the background, the remaining portions of the histogram are used to determine the upper bound of the signal of interest, regardless of whether an air infield situation is known to exist. More particularly, the maximum discriminant $\mu(k)$ of the signal of interest is calculated (step 908). Once the maximum discriminant has been calculated, the minimum function J(k) is calculated (step 910). From the minimum error function and the maximum discriminant function, the function T(k) is calculated (step 912). The function T(k) is then maximized in order to determine an optimal value of k (step 914). The optimal value of k is then normalized to the image. Alternatively, the normalization may occur prior to determination of the maximum of the function T(k) (step 916).

FIG. 10—First Derivative Automatic Histogram Analysis

While the above-described method for determining the upper and lower bounds of the signal of interest is effective, an alternative method for determining the upper and lower bounds of the signal of interest also using only the image histogram may be employed. The upper and lower bounds of the signal of interest may be determined by using the first derivative of the histogram function. The value at which the histogram has a positive slope after the longest period of negative slope is the lower cutoff. The upper cutoff is the value at the end of the last negative slope. Source code relating to this embodiment may be found in the Appendix.

Turning now to FIG. 10, a flowchart illustrating this method of determining the upper and lower bounds of the signal of interest is shown. As above, once radiation has been detected and dark signal calibration has occurred the AGC image is captured. The histogram of the AGC is then generated (step 1002). Calculation of the first derivative of the histogram function and a smoothing of the histogram function occur next (steps 1004, 1006). More particularly, the first derivative is calculated using central difference according to the following equations. For the end points, a three-point derivative is calculated using the following equation:

$$f'(x) = \frac{f(x+h) - f(x-h)}{2h} \text{ where, } h = 1$$

For all other points on the histogram, a five point derivative is calculated using the following equation:

$$f'(x) = \frac{1}{2}\frac{f(x+h_1) - f(x-h_1)}{2h_1} + \frac{1}{2}\frac{f(x+h_2) - f(x-h_2)}{2h_2}$$

where, $h_i = 1$ and $h_2 = 2$

Using five points to calculate the derivative effectively smooths the histogram to remove abrupt dips and spikes. At the same time the first derivative is calculated, consecutive sums of slopes of the same sign are also calculated (step 1008).

Once the derivative and the sums of slopes of the same sign are calculated, a preliminary upper cutoff is calculated by determining the highest intensity peak of the histogram (step 1010). Once the preliminary upper cutoff has been calculated, the largest negative drop in the first derivative is found. This defined to be a preliminary lower cutoff (step 1012).

Next, all derivatives are preferably normalized by the sum of signals in the region of interest. In addition, the area under the histogram is calculated in three unit increments (step 1014). Once the normalization and the integral functions are calculated, the lower cutoff is revised (step 1016). More particularly, the normalized histogram area array is examined between the preliminary upper and lower cutoffs, beginning with the lower cutoff and moving toward the upper cutoff. The point at which the normalized area function exceeds a predetermined, empirically derived threshold, is defined to be the new lower cutoff.

Similarly, the upper cutoff is revised once the lower cutoff has been revised (step 1018). For every point on the histogram between the upper and lower cutoffs, the integral is examined beginning with the upper cutoff and decrementing the index value. If the integral is between two predetermined thresholds (again, empirically-derived values), the upper cutoff is revised.

FIG. 11—Continuous Image Integration

As noted above, one embodiment of the present invention employs continuous image integration over the entire period of radiation application. Thus, rather than terminating image acquisition prior to termination of the radiation beam, the present invention is preferably configured to continuously monitor radiation levels throughout the therapeutic or diagnostic radiation sequence and to terminate image acquisition only after radiation has ceased to be applied. The present invention thus advantageously makes more efficient use of the incident radiation. Source code relating to continuous image acquisition may be found in the Appendix.

Turning now to FIG. 11, a flowchart illustrating continuous image integration according to one embodiment of the present invention is illustrated. Once the upper and lower limits of the ADC window have been determined, acquisition of the portal images occurs (step 1102). During the image acquisition, a maximum intensity level of the image is determined (step 1104). This may occur either through the image itself or its histogram, which is continuously updated. If the intensity level is determined through the ongoing monitoring process is greater than a predetermined threshold, image acquisition and frame processing will continue (step 1106). Preferably, the maximum intensity threshold is set equal to four times the radiation detection threshold. If, in step 1106, the maximum intensity level was determined to be less than four times the dark signal threshold, image acquisition will cease, since radiation will have been determined to have ceased. The remaining frames are then integrated into the images.

The invention described in the above detailed description is not intended to be limited to the specific form set forth herein, but on the contrary, it is intended to cover such alternatives, modifications, and equivalents as can reasonably be included within the spirit and scope of the appended claims. In particular, certain techniques disclosed herein are equally applicable to other types of medical imaging systems, including positron emission tomography (PET), magnetic resonance imaging (MRI), and ultrasound.

We claim:

1. A medical imaging system, comprising:
    an image detector configured to receive an image represented by a radiation beam and convert said image into a visible image;
    a video detector operably coupled to said image detector and configured to receive said visible image and generate a histogram from said visible image; and
    a video processing circuit configured to receive said histogram from said video detector and configured to automatically identify an upper bound and a lower bound on said visible image from examining data on said histogram while said radiation beam is being applied, said upper bound and said lower bound defining a signal of interest; and
    video capture circuitry including a lookup table configured to scale a plurality of images, said look-up table configured to be applied to one or more test images and one or more acquisition images.

2. The medical imaging system of claim 1, wherein said video processing circuit is configured to identify said upper bound of said signal of interest independent of external control signals.

3. The medical imaging system of claim 1, wherein said video processing circuit is configured to determine whether said radiation beam is impinging upon said image detector.

4. The medical imaging system of claim 3, wherein said video processing circuit is configured to evaluate a pixel intensity of a plurality of test images to determine whether said radiation beam is impinging on said image detector.

5. The medical imaging system of claim 4, wherein said video processing circuit is configured to determine a maximum intensity level of said pixel intensity of said plurality of test images to determine whether said radiation beam is impinging on said image detector.

6. The medical imaging system of claim 1, wherein said video processing circuit is configured to calculate said lower bound of said signal of interest using a histogram of said image.

7. The medical imaging system of claim 1, wherein said video detector comprises a flat panel detector array.

8. A medical imaging system in accordance with claim 1, wherein said images are acquired during an entirety of application of said radiation beam.

9. A medical imaging system, comprising:
    an image detector configured to receive an image represented by a radiation beam and convert said image into a visible image, said visible image defining a signal of interest having an upper bound and a lower bound;
    a video detector operably coupled to said image detector and configured to receive said visible image and generate a histogram from said visible image;
    a video processing circuit configured to receive said histogram from said video detector and configured to automatically identify said upper bound and said lower bound of said signal of interest from said histogram, wherein said video processing circuit is configured to evaluate a pixel intensity of a plurality of test images to determine whether said radiation beam is impinging on said image detector; and
    a video capturing board interposed between said video detector and said video processing circuit, said video capturing board including a look-up table configured to scale a plurality of video images, said look-up table configured to be applied to said plurality of test images and one or more acquisition images.

10. A medical imaging device, comprising:
    a detector configured to receive one or more images represented by a radiation beam and convert said one or more images into one or more visible images;
    an interface coupled to said detector and configured to convert said one or more visible images into one or more digital images, said one or more digital images comprising a predetermined portion of said one or more visible images; and
    a processing circuit coupled to said interface and configured to receive said one or more digital images, receive a histogram of said one or more digital images from said interface, and automatically identify a lower bound and an upper bound defining a signal of interest from examining data on said histogram while said radiation beam is being applied; and
    video capture circuitry including a lookup table configured to scale a plurality of images, said look-up table configured to be applied to one or more test images and one or more acquisition images.

11. The medical imaging device of claim 10, wherein said interface comprises a video camera.

12. The medical imaging device of claim 10, wherein said interface comprises a plurality of photosensitive sensors forming a radiation detecting surface.

13. The medical imaging device of claim 10, wherein said processing circuit is further configured to identify when said radiation beam is being applied.

14. The medical imaging device of claim 10, wherein said one or more visible images comprise one or more test images and one or more non-test images.

15. The medical imaging device of claim 14, wherein said histogram is configured to be generated by said interface.

16. The medical imaging device of claim 14, wherein said interface and said processing circuit are configured to receive said one or more test images and determine if radiation is being applied if a pixel intensity level exceeds a predetermined threshold.

17. The medical imaging device of claim 14, wherein said one or more test images have a duration of one-fourth of a duration of said one or more non-test images.

18. The medical imaging device of claim 14, further comprising a video display unit coupled to said processing circuit and configured to display video images of said one or more digital images.

19. The medical imaging device of claim 18, wherein said processing circuit is coupled to receive said one or more digital images for display via an 8 bit interface.

20. The medical imaging device of claim 19, wherein said interface includes a 16 bit buffer for storing said one or more digital images.

21. The medical imaging device of claim 10, wherein a duration of said radiation beam and a duration of detection of said one or more images are substantially coincident.

22. A medical imaging system in accordance with claim 10, wherein said images are acquired during an entirety of application of said radiation beam.

23. A medical imaging device, comprising:
   a detector configured to receive one or more images represented by a radiation beam and convert said one or more images into one or more visible images;
   an interface coupled to said detector and configured to convert said one or more visible images into one or more digital images, said one or more visible images comprising one or more test images and one or more non-test images, said one or more digital images comprising a predetermined portion of said one or more visible images, and defining an upper bound and a lower bound;
   a processing circuit coupled to said interface and configured to receive said one or more digital images, receive a histogram of said one or more digital images from said interface, and automatically identify said lower bound and said upper bound from said histogram;
   a video display unit coupled to said processing circuit and configured to display video images of said one or more digital images;
   wherein said processing circuit is coupled to receive said one or more digital images for display via an 8 bit interface, said interface including a 16 bit buffer for storing said one or more digital images; and
   a look-up table configured with values for converting said one or more digital images from a 16 bit format to an 8 bit format prior to transferring said one or more images to said processing circuit via said 8 bit interface, and said look-up table is further configured to convert both test and acquisition images.

24. A medical imaging device, comprising:
   a detector configured to receive one or more images represented by a radiation beam and convert said one or more images into one or more visible images;
   an interface coupled to said detector and configured to convert said one or more visible images into one or more digital images, said one or more visible images comprising one or more test images and one or more non-test images, said one or more digital images comprising a predetermined portion of said one or more visible images, and defining an upper bound and a lower bound; and
   a processing circuit coupled to said interface and configured to receive said one or more digital images, receive a histogram of said one or more digital images from said interface, and automatically identify said lower bound and said upper bound from said histogram;
   wherein said interface and said processing circuit are configured to receive said one or more test images and determine if radiation is being applied if a pixel intensity level exceeds a predetermined threshold;
   wherein said predetermined threshold obeys the following relation: $T=I_{max}+2\sigma$, where $I_{max}$ is a maximum intensity level, and $\sigma$ is a standard deviation of pixel distribution.

25. A method for determining the bounds of a signal of interest in a medical imaging device, comprising:
   acquiring one or more test images defining a signal of interest;
   generating a first histogram of pixel intensity based on said one or more test images;
   performing a first thresholding operation on said histogram to determine a lower bound of said signal of interest;
   generating a second histogram of pixel intensity, wherein said second histogram comprises pixels having intensity levels greater than said lower bound;
   performing a second thresholding operation on said second histogram to determine said upper bound of said signal of interest, wherein said second thresholding operation comprises:
   determining a minimum error function;
   determining a maximum discriminant function;
   calculating an optimal threshold function, said optimal threshold function being defined as:

$$T(k) = \frac{\log[\upsilon(k)+1]}{J(k)}$$

where $\upsilon(k)$ is the maximum discriminant function, and $J(k)$ is the minimum error function; and
   determining said upper bound by maximizing said optimal threshold function.

26. A medical imaging system comprising:
   an image detector configured to receive an image represented by a radiation beam and convert said image into a visible image, said visible image defining a signal of interest having an upper bound and a lower bound;
   a video detector operably coupled to said image detector and configured to receive said visible image and generate a histogram from said visible image; and
   a video processing circuit configured to receive said visible image and configured to automatically identify said upper bound of said signal of interest from said histogram;

wherein said video processing circuit is configured to evaluate a pixel intensity of a plurality of test images to determine whether said radiation beam is impinging on said image detector;

wherein said video processing circuit is configured to determine a maximum intensity level of said pixel intensity of said plurality of test images to determine whether said radiation beam is impinging on said image detector;

wherein said video processing circuit is configured to calculate a standard deviation of said pixel intensity of said plurality of test images, wherein said standard deviation is used to determine whether said radiation beam is impinging on said image detector; and video capture circuitry including a lookup table configured to scale a plurality of images, said look-up table configured to be applied to one or more test images and one or more acquisition images.

27. A medical imaging system, comprising:

an image detector configured to receive an image represented by a radiation beam and convert said image into a visible image, said visible image defining a signal of interest;

a video detector operably coupled to said image detector and configured to receive said visible image and generate a histogram from said visible image; and a video processing circuit configured to receive said histogram from said video detector and configured to automatically identify said upper bound of said signal of interest from said histogram while said radiation beam is being applied;

wherein said video processing circuit is configured to determine a maximum intensity level of a pixel intensity level of a plurality of test images to determine whether said radiation beam is impinging upon said image detector;

wherein said video processing circuit is configured to calculate a standard deviation of said pixel intensity level of said plurality of test images, wherein said standard deviation is used to determine whether said radiation beam is impinging on said image detector;

wherein said video processing circuit is configured to calculate a threshold, defined as a maximum intensity level plus twice said standard deviation, wherein said radiation beam is determined to be impinging upon said image detector if said pixel intensity of said plurality of test images is greater than said threshold.

28. A medical imaging system, comprising:

an image detector configured to receive an image represented by a radiation beam and convert said image into a visible image, said visible image defining a signal of interest having an upper bound and a lower bound;

a video detector operably coupled to said image detector and configured to receive said visible image and generate a histogram from said visible image; and a video processing circuit configured to receive said visible image and configured to automatically identify said upper bound of said signal of interest from said histogram;

wherein said video processing circuit is configured to calculate said upper bound of said signal of interest by applying and maximizing the following formula for T(k) to said histogram:

$$T(k) = \frac{\log[v(k)+1]}{J(k)}$$

$$v(k) = \sigma^2(k) = \sum_{C=1,2} \omega(k)[\bar{i}_c(k) - \bar{i}_T]^2$$

$$J(k) = \omega_1(k)\log\left[\frac{\sigma_2(k)}{\omega_1(k)}\right] + \omega_2(k)\log\left[\frac{\sigma_2(k)}{\omega_2(k)}\right]$$

where $\omega(k)$ is a probability of occurrence, $\sigma(k)$ is a standard deviation, and $i(k)$ is the class mean.

29. A medical imaging device, comprising:

a detector configured to receive one or more images represented by a radiation beam and convert said one or more images into one or more visible images;

an interface coupled to said detector and configured to convert said one or more visible images into one or more digital images, said one or more digital images comprising a predetermined portion of said one or more visible images, and defining an upper bound and a lower bound;

a processing circuit coupled to said interface and configured to receive said one or more digital images, receive a histogram of said one or more digital images from said interface, and automatically identify said lower bound and said upper bound from said histogram while said radiation beam is being applied;

wherein said processing circuit is configured to determine said lower bound by calculating a first derivative of said histogram, and determining a location of a largest negative drop in said first derivative.

30. The medical imaging device of claim 29, wherein said processing circuit is configured to determine said lower bound by determining a point on said histogram wherein an incremental integral of said histogram exceeds a predetermined value.

31. A medical imaging device, comprising:

a detector configured to receive one or more images represented by a radiation beam and convert said one or more images into one or more visible images;

an interface coupled to said detector and configured to convert said one or more visible images into one or more digital images, said one or more digital images comprising a predetermined portion of said one or more visible images and defining an upper bound and a lower bound; and a processing circuit coupled to said interface and configured to receive said one or more digital images, receive a histogram of said one or more digital images from said interface, and automatically identify said lower bound and said upper bound from said histogram while said radiation beam is being applied;

wherein said processing circuit is configured to determine said upper bound by determining a location of a highest intensity level on said histogram.

32. The medical imaging device of claim 31, wherein said processing circuit is configured to determine said upper bound by determining a point on said histogram wherein an incremental integral of said histogram is greater than a first predetermined value and is less than a second predetermined value.

33. A method for determining the bounds of a signal of interest in a medical imaging device, comprising:

acquiring one or more test images defining a signal of interest;

generating a first histogram of pixel intensity based on said one or more test images;

calculating a first derivative of said histogram;

calculating one or more local integrals of said histogram;

determining a preliminary lower bound by finding a location of a largest negative drop in said first derivative;

determining a preliminary upper bound by finding a location of a maximum intensity level of said histogram;

revising said lower bound by finding a location at which said one or more local integrals exceeds a first predetermined value; and revising said upper bound by finding a location at which said one or more local integrals exceeds a second predetermined value and is less than a third predetermined value.

34. A medical imaging system, comprising:

a detector configured to receive one or more images represented by a radiation beam and convert said one or more images into one or more visible images;

an interface coupled to said detector and configured to convert said one or more visible images into one or more digital images, said one or more digital images comprising a predetermined portion of said one or more visible images; and a processing circuit coupled to said interface and configured to receive said one or more digital images, and determine whether said radiation beam is on by evaluating a pixel intensity of said images;

wherein said processing circuit is configured to determine a maximum intensity level of said pixel intensity and a standard deviation of said pixel intensity to determine whether said radiation beam is on; and wherein said processing circuit is configured to calculate a threshold, defined as said maximum intensity level plus twice said standard deviation, wherein said radiation beam is determined to be on if said pixel intensity level is greater than said threshold; and video capture circuitry operably coupled to said processing circuit.

35. A medical imaging system, comprising:

an image detector configured to receive an image represented by a radiation beam and convert said image into a visible image;

a video detector operably coupled to said image detector and configured to receive said visible image and generate a histogram from said visible image; and a video processing circuit configured to receive said histogram from said video detector and configured to automatically identify an upper bound and a lower bound on said visible image from said histogram bound on said visible image from said histogram while said radiation beam is being applied, said upper bound and said lower bound defining a signal of interest; and a video capturing board interposed between said video detector and said video processing circuit.

36. A medical imaging system in accordance with claim 35, wherein said images are acquired during an entirety of application of said radiation beam.

37. A medical imaging device, comprising:

a detector configured to receive one or more images represented by a radiation beam and convert said one or more images into one or more visible images;

an interface coupled to said detector and configured to convert said one or more visible images into one or more digital images, said one or more digital images comprising a predetermined portion of said one or more visible images; and a processing circuit coupled to said interface and configured to receive said one or more digital images, receive a histogram of said one or more digital images from said interface, and automatically identify a lower bound and an upper bound defining a signal of interest from said histogram while said radiation beam is being applied; and a video capturing board interposed between said video detector and said video processing circuit.

38. A radiation therapy device, comprising:

a detector configured to receive one or more images represented by a radiation treatment beam and convert said one or more images into one or more visible images;

an interface coupled to said detector and configured to convert said one or more visible images into one or more digital images, said one or more digital images comprising a predetermined portion of said one or more visible images; and a processing circuit coupled to said interface and configured to receive said one or more digital images, and determine whether said radiation treatment beam is on;

wherein said detector is configured to continue receiving said images so long as said radiation treatment beam is detected as being on; and a video capturing board interposed between said video detector and said video processing circuit.

39. A radiation therapy device in accordance with claim 38, wherein said images are acquired during an entirety of application of said radiation beam.

* * * * *